(12) United States Patent
DePietro (10) Patent No.: US 9,631,658 B2
(45) Date of Patent: Apr. 25, 2017

(54) PULL-UP BOLT ASSEMBLY

(71) Applicant: Universal Hinge Corporation, Manchester, NH (US)

(72) Inventor: Edward A. DePietro, Manchester, NH (US)

(73) Assignee: Universal Hinge Corporation, Manchester, NH (US)

( * ) Notice: Subject to any disclaimer, the term of this patent is extended or adjusted under 35 U.S.C. 154(b) by 316 days.

(21) Appl. No.: 14/336,316

(22) Filed: Jul. 21, 2014

(65) Prior Publication Data
US 2014/0328643 A1 Nov. 6, 2014

Related U.S. Application Data (63) Continuation-in-part of application No. 13/057,791, filed on Oct. 15, 2012, now Pat. No. 8,784,024.

(51) Int. Cl.
*F16B 13/04* (2006.01)
*F16B 13/06* (2006.01)

(52) U.S. Cl.
CPC .................. *F16B 13/065* (2013.01)

(58) Field of Classification Search
CPC .................................... F16B 13/065
USPC ... 411/24, 25, 27, 28, 32–35, 37, 44, 45, 49, 411/54, 54.1, 5, 57.1, 58, 60.2, 63, 70, 411/18, 60.1; 414/684.3; 109/64
See application file for complete search history.

(56) References Cited

U.S. PATENT DOCUMENTS

| | | | | |
|---|---|---|---|---|
| 3,143,983 A * | 8/1964 | Maynard | ................ | E05G 1/026 109/64 |
| 3,159,075 A * | 12/1964 | Bjork | ...................... | F16B 35/02 411/271 |
| 3,916,480 A * | 11/1975 | Smith | ....................... | E05D 5/04 16/383 |
| 4,478,546 A * | 10/1984 | Mercer | .................. | F16B 35/02 411/385 |
| 4,862,556 A * | 9/1989 | Grass | .................... | E05D 5/0276 16/382 |
| 5,561,888 A * | 10/1996 | Lautenschlager | ..... | E05D 5/0276 16/254 |
| 5,634,754 A * | 6/1997 | Weddendorf | ......... | F16B 13/065 411/354 |
| 6,534,735 B1* | 3/2003 | Czarnecki | ............. | H02B 1/066 200/293 |
| 6,786,343 B1* | 9/2004 | Porebski | ............... | B66C 23/203 212/166 |
| 7,008,165 B1* | 3/2006 | Grimes | ................... | B62B 3/108 269/17 |
| 7,516,518 B2* | 4/2009 | Kiefer | .................. | E05D 5/0246 16/252 |
| 7,556,160 B2* | 7/2009 | Porebski | ............... | B66C 23/203 212/179 |

* cited by examiner

*Primary Examiner* — Gary Estremsky
(74) *Attorney, Agent, or Firm* — Robert R. Deleault, Esq.; Mesmer & Deleault, PLLC (57) ABSTRACT

An improved pull-up bolt assembly adapted to be used for supporting a high-weight structure to a hinge component using an opening or recess in the high-weight structure, the bolt assembly having a pull-up bolt member, a nut component, a tapered member, and an expandable friction member, where the improvement includes one or more threads helically disposed about the expandable friction member, the one or more threads each having a height, a width and a helical angle.

1 Claim, 10 Drawing Sheets

PULL-UP BOLT ASSEMBLY

CROSS-REFERENCE TO RELATED APPLICATIONS

This application is a continuation-in-part of U.S. patent application Ser. No. 13/057,791, filed Oct. 15, 2012.

BACKGROUND OF THE INVENTION

1. Field of the Invention

The present invention relates generally to expansion bolts. Particularly, the present invention relates to expansion bolts used with "manway" covers for access to enclosed spaces such as tanks, conduits, storage areas, heat exchanger tubes. More particularly, the present invention relates to expansion bolts used with mechanisms to assist in the removal of "manway" covers. Even more particularly, the present invention relates to expansion bolts used with mechanisms for handling the removal and installation of "manway" covers that are either too hazardous, or too heavy, or too cumbersome to be handled by an unaided individual.

2. Description of the Prior Art

Manway covers are typically large, heavy, metal plates that are bolted to an opening. For purposes of the present invention, the definition of "manway covers" expressly means any heavy covers or closures used on pressure vessels, vacuum vessels, atmospheric vessels, heat exchangers, heat exchanger channel covers, heat exchanger channels, heat exchanger bonnets, or any type of blanking plate and is not construed to be limited to only covers used on openings that are dimensionally-sized to allow passage of a human. The most common are circularly-shaped and mate to a flange by way of a plurality of bolts evenly spaced around the periphery of the opening. However, it should be understood that the heavy covers may be any shape. The defined manway covers typically provide access to enclosed spaces such as tanks, conduits, storage areas, transfer tubes, pressure vessels, vacuum vessels, atmospheric vessels, heat exchangers, heat exchanger channel covers, heat exchanger channels, heat exchanger bonnets, and the like.

Routine servicing and inspection requirements as well as other operating conditions necessitate periodic removal of these manway covers. In view of the typical location and weight of the manway covers, it is not a simple task to remove the cover or to re-install the same. Removal is currently accomplished with the use of hand operated davit swing arms, chain falls, ratchet hoists, hinge devices, and brute force. Except for davit swing arms and hinge devices, it is necessary during the removal process to lower the covers a distance to a level surface.

Various devices have been devised to facilitate manway cover removal and re-installation. U.S. Patent Application Publication 2008/0256753 (2008, DePietro et al.) discloses a portable manway cover hinge device. The hinge device has a pair of hinge plates where each hinge plate has a support member with a hinge aperture positioned for alignment with a bolt opening of a manway cover and a manway flange, a linkage member adjacent a first end of each hinge plate and extending out of the plane of the hinge plate, and a pivotal connection coupling overlapping pairs of the linkage member of the pair of hinge plates.

U.S. Patent Application Publication 2008/0256866 (2008, DePietro et al.) discloses a portable manway cover hinge device. The hinge device has a pair of elongated hinge members where each hinge member has a pair of longitudinally-aligned, elongated apertures, a support member slidably connected to each of the elongated apertures where the support member has a pin receiving end, and a linkage member pivotally connected to each of the pair of elongated hinge members.

U.S. Patent Application Publication 2005/0242051 (2005, Porebski et al.) discloses a removable cover support system having a base member and a securing mechanism slidably insertable through at least one of a cover flange hole of a cover assembly, a retaining sleeve connected to the securing base assembly, a swingarm assembly rotatably supported by the retaining sleeve, and a lifting mechanism connected to the swingarm assembly.

U.S. Pat. No. 4,519,519 (1985, Meuschke et al.) discloses a davit assembly that is connected with a transfer tube and a hatch cover to move the cover away. The davit assembly, which is a swingarm, is permanently attached to the outside of the transfer tube.

U.S. Pat. No. 4,297,072 (1981, Shah et al.) discloses a manway handling apparatus having a support arm pivotally mountable on equipment having elliptical manway access openings. The support arm when mounted is swingable toward and away from an access opening and carries a bearing block supporting bracket which is longitudinally adjustably positionable on the arm. The bearing block is vertically adjustably positionable in the bracket and slidably supports a shaft which is attachable to an elliptical cover. The shaft carries structure means which when actuated by turning of a crank handle is effective for tilting the cover and to facilitate its installation and removal.

U.S. Pat. No. 4,865,513 (1989, Norris) discloses a portable manway cover handling apparatus. A boom is mounted within a sleeve for longitudinal translation and the sleeve is hinged to a base plate that is securable by a C-clamp to a superstructure beam in front of a manway cover. A hydraulic actuator bears against the sleeve to adjust its elevation. A powered cable winch is joined to one end of the boom and its cable passes through the boom, which is hollow to the opposite end, and about a pulley to a fastener for attachment to an eye secured in the upper edge of the manway cover. A presser foot is hydraulically actuated to bear against the manway cover with the cable attached to the cover so that the bolts holding the cover in place can be removed. Guide pins are provided for installation in the mounting flange to pilot the cover into registration with the bolt holes when the cover is to be mounted rather than demounted.

Some of the prior art devices discuss the use of tapered pins, pins or expansion plugs, however, they suffer from serious disadvantages. These include the fact that the manway covers are extremely heavy and tapered pins, straight pins or expansion plugs would not safely support the weight of the cover or securely hold a cover to the various manway cover swingarm devices or hinge devices causing a serious hazard to a user.

The mechanical attachment of two components with one component having a blind hole and the other component having a through hole has not been feasible without additional machining. The standard practice is to tap the blind hole with threads. A bolt is installed into the tapped hole, which creates a pull-up force to secure the two components with both friction and tensile forces.

Design clearances between bolt diameters and bolt holes allow for lateral movement within the design clearances. Lateral movement between the two components can occur if the interface friction is less than the lateral force between the two components. Locating pins may be installed to precisely locate the two components, but require accurate machining and dowel pins to eliminate lateral movement.

In another application, the two components to be attached both having through holes. It is often desirable to attach these types of components such that the attaching device does not extend beyond or outside one of the through holes. It is also possible to tap one or both of the through holes for receiving a bolt.

However, rules regarding the machining of hardware after certification of certain types of equipment may prevent machining of components without recertification. Recertification of installed equipment operating in the field can be expensive, time consuming, and in many cases impossible.

Therefore, what is needed is a removable expansion device that can safely support the weight of a manway cover as well as hold a manway cover to a manway swingarm device or a manway hinge device without the need to alter the structural integrity of the manway cover or a mating flange.

SUMMARY OF THE INVENTION

It is an object of the present invention to provide a removable, re-usable expansion fastening device that safely supports the weight of manway covers. It is another object of the present invention to provide a removable, re-usable expansion fastening device that holds a manway cover to a manway swingarm device or a manway hinge device without altering the structural integrity of the manway cover or its mating flange.

The present invention achieves these and other objectives by providing a pull-up bolt assembly for frictionally supporting a high-weight structure to a hinge component using an opening or recess in the high-weight structure as well as resisting the pull out forces imposed by the manway cover. The pull-up bolt assembly includes a pull-up bolt member with a threaded shaft and an abutting member end, a nut component threadably attached to a nut-receiving end of the pull-up bolt member, a tapered member disposed around the threaded shaft between the nut component and the abutting member end, and a radially expandable friction member disposed around the threaded shaft between the tapered member and the abutting member end.

In one embodiment of the pull-up bolt assembly of the present invention, the pull-up bolt member has the threaded shaft with a first shaft end and a second shaft end, and the abutting member with a tapered surface formed at the first shaft end. The abutting member is wider than and tapers toward the threaded shaft. The nut component has an external torque-applying surface. The tapered member has a tapered end portion and an optional flange formed between the external torque-applying surface of the nut component and the tapered end portion where the tapered end portion faces toward the tapered surface of the abutting member. The radially expandable friction member is disposed around the threaded shaft between the abutting member and the tapered member. At least a portion of the expandable friction member expands outwardly in a radial direction relative to the longitudinal axis of the threaded shaft when the nut component is threadably moved (i.e. tightened) toward the abutting member of the pull-up bolt member.

In another embodiment of the present invention, the second shaft end of the pull-up bolt member has an end face with a slot. The slot is configured to receive the straight blade of a straight screwdriver.

In a further embodiment of the present invention, the nut component and the tapered member with the flange are integrally formed.

In another embodiment of the present invention, the tapered member includes a cylindrically-shaped portion between the tapered end portion and the flange. The cylindrically-shaped portion is an alignment surface with a diameter in close tolerance with a pin receiving opening in a manway hinge device.

In still another embodiment of the present invention, the tapered member includes a cylindrical central portion having a stop end with a peripheral surface that extends laterally from the cylindrical central portion, a tapered end opposite the stop end, and a bore through the tapered member that is larger than the threaded shaft of the pull-up bolt member.

In yet another embodiment of the present invention, the expandable friction member has a plurality of slots extending from each friction member end to a central continuous portion. In another embodiment of the expandable friction member, the plurality of slots extend from each friction member end a predefined distance along the longitudinal length of the friction member and ending adjacent the opposite friction member end sufficient to maintain a continuous, single, unitary friction member.

In another embodiment of the present invention, the expandable friction member has an inclined inner wall portion with a diameter gradually decreasing between a friction member end to an inner portion.

In another embodiment of the present invention, there is optionally included an anti-rotation member configured to prevent the expandable friction member from rotating around the pull-up bolt member. In one embodiment, the anti-rotation member may be a pin or shoulder that laterally extends from the pull-up bolt member and mates with an end notch formed into the friction member end of the expandable friction member.

In another embodiment of the present invention, the expandable friction member has a Rockwell hardness that is equal to or greater than the Rockwell hardness of the structural component such as a manway cover in which it is to be used. Because of the shear and pull-out forces associated with the weight of manway covers and the safety issues that arise when such covers are removed, the Rockwell hardness ratio of the friction member and the structural component is an important factor when safety is the primary concern. A ratio of less that 1 to 1 of the friction member to the structural component (One example of such a ratio is 0.8 to 1) means that the friction member is "softer" than the structural component and will "deform" under expansion pressure (pressure caused by the expansion of the expandable friction member within the bolt opening of the manway cover/flange) before the structure component surface deforms. In the configuration where the Rockwell hardness ration is greater than 1 to 1 of the expandable friction member to the bolt opening in the cover/flange, the expandable friction member is said to "bite" into the wall surface of the bolt opening placing the expandable friction member in shear with the bolt opening. In the latter configuration where the Rockwell hardness of the expandable friction member is less than that of the bolt opening, the concept is somewhat reversed. Except in situations where cover and flange bolt opening surfaces are polished, the bolt opening surface is irregular. Typically, scoring marks and scratches exist in the surface. By using an expandable friction member 40 that has a Rockwell hardness less than the material use for the cover or flange, the softer friction member 40 will deform under expansion pressure causing the friction member 40 to "flow" into some of the recesses of the scoring marks and scratches, which deformation will also resist pull-out forces imposed by the manway cover.

In a further embodiment of the present invention, the expandable friction member has an outer surface with one or more surface characteristics selected from a surface that is roughened, knurled, grooved, ridged, threaded, and the like. In embodiments wherein the expandable friction member has an outer surface with a threaded characteristic, the threaded characteristic may be one or more threads helically disposed about the expandable friction member. In these embodiments, the one or more threads may each have a thread height, a thread width, and a thread pitch. The width of the one or more threads and the height of the one or more threads forms a ratio.

In yet another embodiment of the present invention, the expandable friction member has a lateral flange that may be used with manway covers incorporating a gasket. The gap between the cover and the flange caused by the gasket provides a configuration where the friction member flange can be expanded into the gap further preventing any pull-out of the pull-up bolt assembly.

In another embodiment of the present invention, there is a combination hinge device and a plurality of pull-up bolt assemblies for manway covers.

In another embodiment of the present invention, there is a method of using one embodiment of a pull-up bolt assembly for connecting a manway cover hinge device to a manway cover. The method includes removing a securing bolt from a manway cover and exposing a bolt opening in the manway cover, aligning an opening in a hinge plate of a manway hinge device with the bolt opening in the manway cover, inserting a pull-up bolt assembly having a pull-up bolt with a threaded rod and a tapered surface on a first end, a radially expandable friction member disposed over the threaded rod and a nut member threadably connected to the threaded rod adjacent a second end of the pull-up bolt into the opening in the hinge plate and the bolt opening in the manway cover whereby the expandable friction member is positioned within the bolt opening in the manway cover, and tightening the nut member toward the tapered surface on the first end of the pull-up bolt causing the expandable friction member to expand radially and securely fix the pull-up bolt within the bolt opening of the manway cover and the hinge plate to the manway cover.

DETAILED DESCRIPTION OF THE PREFERRED EMBODIMENT

Figure 1:
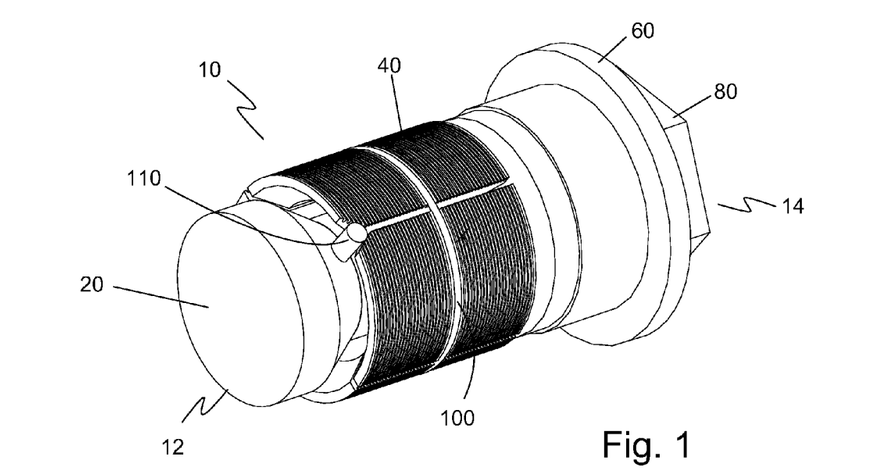
FIG. 1 is a perspective view of one embodiment of the present invention showing the pull-up bolt assembly.

The preferred embodiment(s) of the present invention is illustrated in FIGS. 1-27. FIG. 1 illustrates one embodiment of the present invention showing a pull-up bolt assembly 10. Pull-up bolt assembly 10 includes a pull-up bolt member 20, a radially expandable friction member 40, a tapered member 60, and a nut component 80. In this embodiment, a retaining ring 100 is disposed around the friction member 40 and an optional anti-rotation member 110 laterally extends from pull-up bolt member 20 and cooperates with expandable friction member 40. Pull-up bolt assembly 10 has a blind end 12 and a torque-applying end 14.

Figure 2:
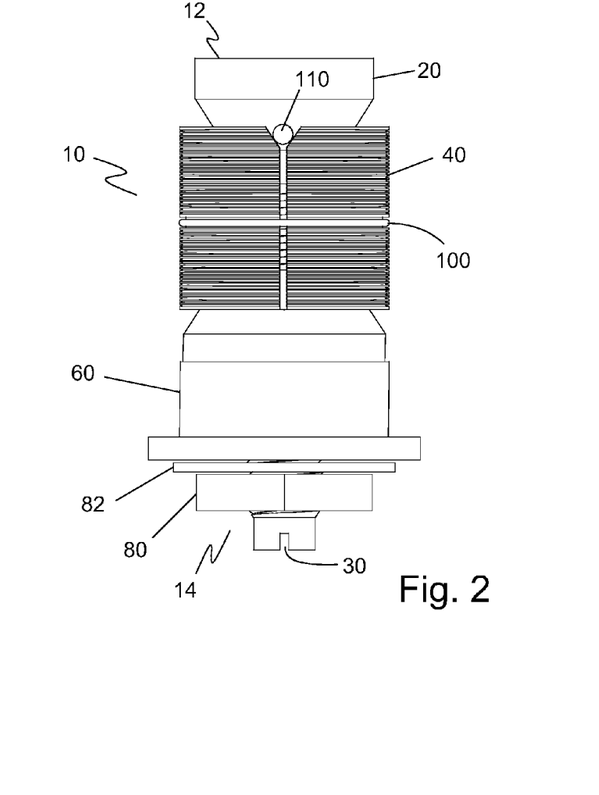
FIG. 2 is a side plan view of the embodiment shown in FIG. 1.

Turning to FIG. 2, there is shown a side view of pull-up bolt assembly 10 illustrated in FIG. 1. Optional anti-rotation member 110 is configured to prevent the expandable friction member 40 from rotating around pull-up bolt member 20. An optional washer 82 may also be positioned between nut component 80 and tapered member 60. Because blind end 12 of pull-up bolt assembly 10 is typically unaccessible during use for removing manway covers, pull-up bolt assembly 10 optionally includes an anti-rotation structure 30 (not shown) formed in or at torque-applying end 14 to prevent the pull-up bolt member from rotating when a torque is applied to nut component 80 during installation of the pull-up bolt assembly 10 into a manway cover.

Figure 3:
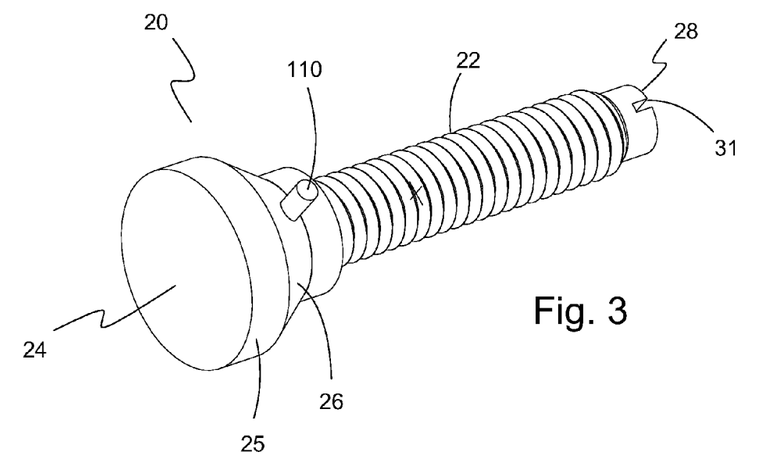
FIG. 3 is a perspective view of one embodiment of a pull-up bolt member used in the pull-up bolt assembly shown in FIG. 1.
Figure 4:
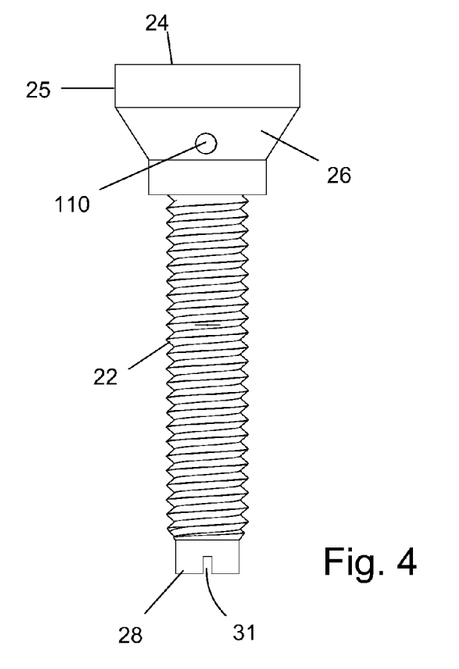
FIG. 4 is a side plan view of the pull-up bolt member shown in FIG. 3.
Figure 5:
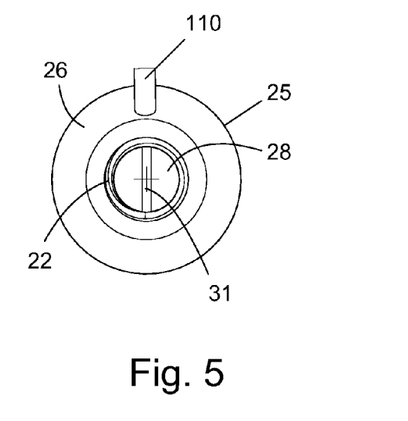
FIG. 5 is a bottom plan view of the pull-up bolt member shown in FIG. 3.
Figure 6:
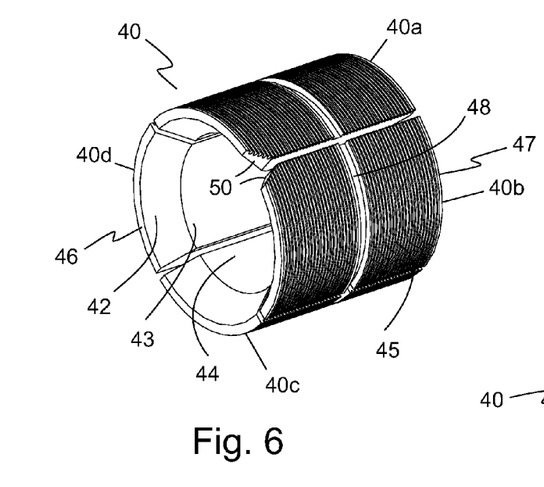
FIG. 6 is a perspective view of one embodiment of a radially expandable friction member shown in FIG. 1.
Figure 7:
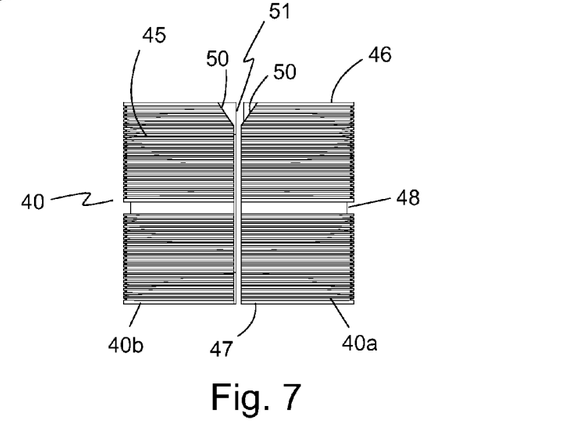
FIG. 7 is a side plan view of the expandable friction member shown in FIG. 6.
Figure 8:
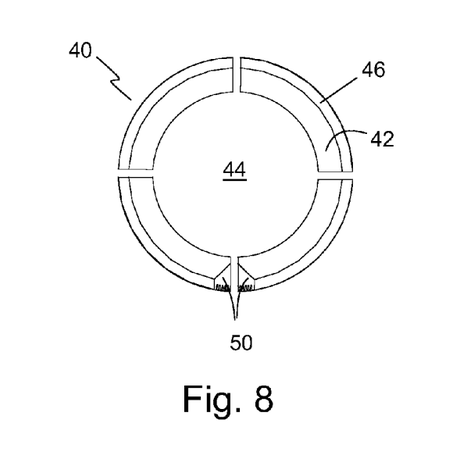
FIG. 8 is a first end view of the expandable friction member shown in FIG. 6.
Figure 9:
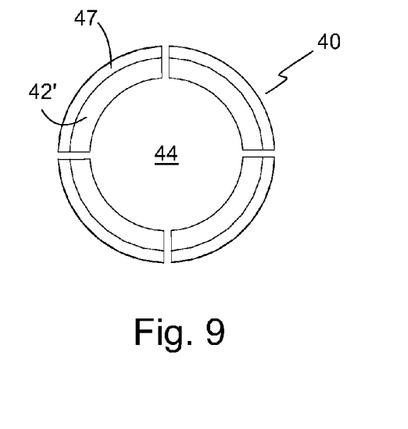
FIG. 9 is a second end view of the expandable friction member shown in FIG. 6.

FIGS. 3 to 5 illustrate one embodiment of pull-up bolt member 20. Pull-up bolt member 20 includes a threaded shaft 22 with a first shaft end 24 and a second shaft end 28. First shaft end 24 includes an abutting member 25 with a tapered surface 26. Abutting member 25 is wider than threaded shaft 22 and tapered surface 26 tapers toward threaded shaft 22. Tapered surface 26 presents an inclined surface for receiving an end of expandable friction member 40. In this embodiment, anti-rotation structure 30 at second shaft end 28 includes a shaft end face 29 and a slot 31 within shaft end face 29 for receiving a straight end screwdriver. Also in this illustrated embodiment, anti-rotation member 110 is a pin that extends laterally from pull-up bolt member 20 to engage expandable friction member 40. Anti-rotation member 110 eliminates relative motion between friction member 40 and tapered member 60, reducing friction during the tightening process and prevents galling and wear of the components. If abutting member 25 and threaded shaft 22 are manufactured as two components, anti-rotation member 110 can be used as the pin joining the two components. Abutting member 25, tapered surface 26 and threaded shaft 22 may be manufactured as a single component or may be made as two components. When manufactured as two components, a threaded bore is formed in abutting member 25 and tapered surface 26. In this case, threaded shaft 22 is treated with an anti-loosening agent such as lock-tite, screwed into abutting member 25, and pinned where the pin is anti-rotation member 110. Anti-rotation member 110 may be coupled to abutting member 25 or it may be integrally formed with abutting member 25. It should be understood that anti-rotation member 110 may also be coupled to threaded shaft 22 with expandable friction member 40 being modified to engage with anti-rotation member 110.

Turning now to FIGS. 6 to 9, there is illustrated one embodiment of expandable friction member 40. Expandable friction member 40 is cylindrically-shaped and has a first and second friction member ends 46, 47. Optionally one or both friction member ends 46, 47 may have an inclined inner wall portion 42, 42', respectively, having a diameter that gradually decreases between each of the friction member ends 46, 47 to an inner portion 43. In this embodiment, expandable friction member 40 is made up of a plurality of longitudinal member body segments. The plurality of member body segments includes four friction member side portions 40a, 40b, 40c, and 40d. Each side portion forms one-quarter of the cylinder wall of radially expandable friction member 40. The plurality of segments of friction member 40 are kept together with retaining ring 100, which surrounds substantially all of friction member 40 and is disposed in a friction member groove 48 in an outer surface 45 of friction member 40. It should be understood that the plurality of segments may be 2, 3, 4, or more and that the four segmented friction member 40 is not limiting. It is also noted that the spacing between each friction member side portion is for clarity purposes only since retaining ring 100 would hold friction side portions 40a-d together yet allow friction member 40 to radially expand during use without excessive resistive forces. The retaining ring 100 is made for either spring steel or oil resistant O-ring material. Optionally, adjacent corners of friction member side portions 40a and 40b may be removed forming an angled surface 50, which, when friction member 40 is assembled, forms an anti-rotation member receiving notch 51. Outer surface 45 of friction member 40 may optionally have a non-smooth finish such as a surface that is roughened, knurled, grooved, ridged, threaded, and the like, to provide better frictional properties when installed in a manway cover bolt opening.

Figure 10:
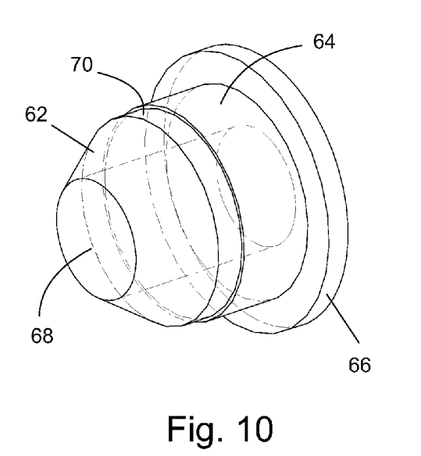
FIG. 10 is a perspective view of one embodiment of a tapered member used in the pull-up bolt assembly shown in FIG. 1.
Figure 11:
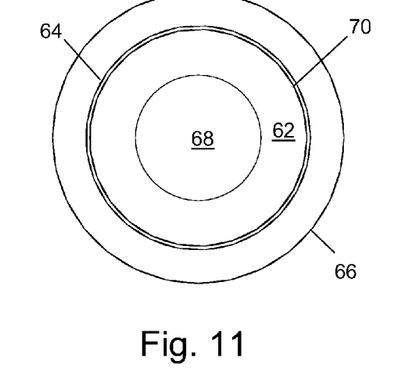
FIG. 11 is an end view of the embodiment of the tapered member shown in FIG. 9.

Turning now to FIGS. 10 and 11, there is illustrated one embodiment of a tapered member 60. Tapered member 60 has a tapered end portion 62 and a flange 66 that functions as an end stop that contacts a manway hinge device when pull-up bolt assembly 10 is inserted into the aligned openings of a manway cover bolt opening and a manway hinge device opening. In this embodiment, tapered member 60 has an alignment surface 64 adjacent flange 66 sized for a close-tolerance fit to the opening in the manway hinge device and a structure support surface 70 between alignment surface 64 and tapered end portion 62. Tapered end portion 62 engages friction member end 47 of friction member 40. Structure support surface 70 is sized for a close-tolerance fit with the manway cover bolt opening to provide a shear surface upon which the edge of the bolt opening is in contact. Structure support surface 70 may be cylindrical or have a taper. For the cylindrically-shaped embodiment, structure support surface 70 has a diameter smaller than the diameter of alignment surface 64 but within very close tolerance to the bolt opening. The close tolerance typically does not differ more than about minus twenty-thousandths of an inch (−0.020") (−0.5 mm) from the diameter of the bolt opening. For the tapered embodiment, surface 70 is a tapered surface which begins at alignment surface 64 and reduces in diameter as it approaches tapered end portion 62. The angle of the taper is smaller than angle of the taper on tapered end portion 62. The taper angle of structure support surface 70 is greater than 0° and less than or equal to 10°. The preferred taper angle is about 1°. In both structure support surface embodiments, structure support surface 70 begins within the hinge device 1 and extends into the cover 2 or flange 3 to provide a shear surface limiting any sliding between the cover 2 and the hinge device 1. For example, when tapered member 60 is configured like the embodiment shown in FIG. 10, structure support surface 70 would have approximately 0.015" radial clearance between surface 70 and the inside diameter of the bolt opening in the cover/flange). Specifically for safety reasons, the close-tolerance fit is important for providing the necessary reliability required for holding and supporting the manway cover with the pull-up bolt assembly 10. Tapered member 60 also includes a bore 68 through its entire length that is sized to allow passage of threaded shaft 22 therethrough. The diameter of structure support surface 70 is the same or less than the diameter of expandable friction member 40.

Figure 12:
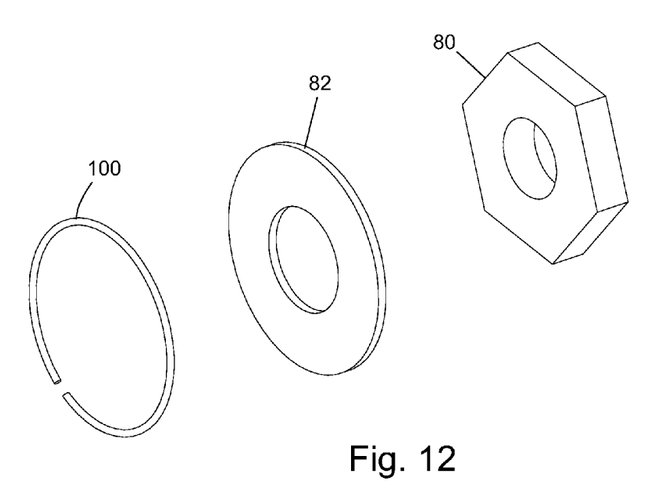
FIG. 12 is a perspective view of one embodiment of a friction member retainer ring, a washer and a pull-up bolt nut component of the embodiment shown in FIG. 1.

FIG. 12 illustrates one embodiment of retaining ring 100, washer 82 and nut component 80. The shapes of these components are merely illustrative and can be modified so long as their functional characteristics are not compromised. Particularly, retaining ring 100 is a split ring and may have a cross-sectional shape that is circular (as shown), oval, rectangular, square, hexagonal, and the like.

Figure 13:
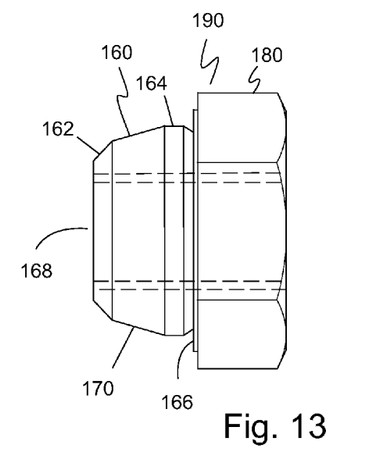
FIG. 13 is a side plan view of another embodiment of the present invention showing an integral tapered member and pull-up bolt nut component.
Figure 14:
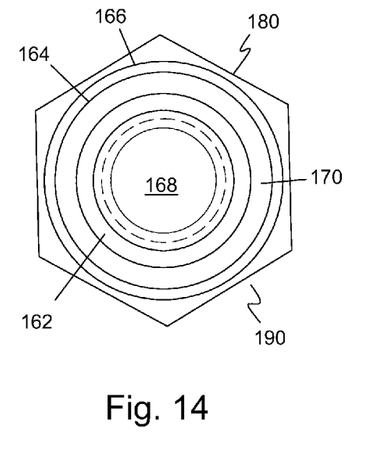
FIG. 14 is an end view of integral tapered member and nut component shown in FIG. 13.

Turning now to FIGS. 13 and 14, there is illustrated another embodiment of the tapered member and nut component. In this embodiment, a tapered member 160 is integrally formed with a nut component 180 creating a bushing nut component 190. Tapered member 160 has a tapered end portion 162 and a flange 166 that functions as an end stop which contacts a manway hinge device when pull-up bolt assembly 10 is inserted into the aligned openings of a manway cover bolt opening and a manway hinge device opening. It is also contemplated that flange 166 may be a separate washer. In this embodiment, tapered member 160 has an alignment surface 164 adjacent flange 166 sized for a close-tolerance fit to the opening in the manway hinge device and a structure support surface 170 between alignment surface 164 and tapered end portion 162. Tapered end portion 162 engages friction member end 47 of friction member 40. Structure support surface 170 in this embodiment is an inclined surface that has less of an incline angle than tapered end 162. Structure support surface 170 is sized for a close-tolerance fit with the manway cover bolt opening so that support surface 170 engages the manway cover bolt opening when all of the cover bolts are removed, which causes the cover to "sag" onto support surface 170 if and when the cover slips. Tapered member 160 also includes a bore 168 through its entire length that is sized to allow passage of threaded shaft 22 therethrough. Bore 168, however, may be completely threaded or may be a shaft through tapered member 160 with a diameter that is larger than the outer thread diameter of threaded shaft 22. In the latter case, it is contemplated that nut component 180 has internal threads for threadably attaching bushing nut component 190. The largest diameter of structure support surface 170 is the same or less than the diameter of expandable friction member 40. The bushing nut component 190 has a hex internal recess or external shape or other structure such as slots or flats on one end for wrenching.

Figures 15, 16:
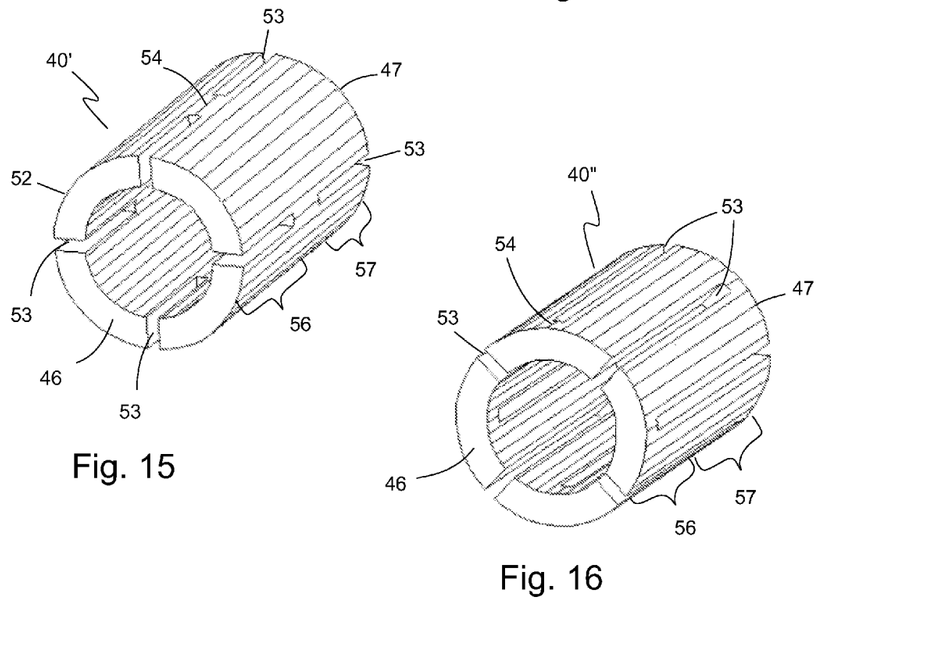
FIG. 15 is a perspective view of another embodiment of the expandable friction member of the present invention.
FIG. 16 is a perspective view of another embodiment of the expandable friction member of the present invention.

FIG. 15 is a perspective view of another embodiment of a radially expandable friction member 40'. Expandable friction member 40' includes a plurality of slots 53 that are formed into a cylindrical wall 52 of friction member 40'. Slots 53 extend longitudinally from each friction member end 46, 47 toward a central friction member portion 54. Slots 53 that extend from opposite ends 46, 47 of friction member 40' may be aligned or offset. Central friction member portion 54 maintains expandable friction member 40' as a unitary component that allows end portions 56, 57 to expand radially. Although not shown, friction member ends 46, 47 may optionally (but preferably) include inclined inner surfaces similar to the inclined inner surfaces 42 shown if FIG. 6.

FIG. 16 is a perspective view of another embodiment of a radially expandable friction member 40". Expandable friction member 40" includes a plurality of slots 53 that are formed into a cylindrical wall 52 of friction member 40". Slots 53 extend longitudinally from each friction member end 46, 47 a predefined distance along the longitudinal length of friction member 40" and ending adjacent the opposite friction member end leaving a friction member connective portion 58 sufficient to maintain a expandable friction member 40" as a unitary component. As seen from FIG. 15, adjacent slots 53 are and must necessarily be offset from each other. This configuration allows the end portions 56, 57 to expand radially outward. All embodiments of the radially expandable friction member are made of a material that is ductile and has a Rockwell B hardness scale value of 300 or more. The currently preferred material is metallic.

Figures 17, 18, 19, 20:
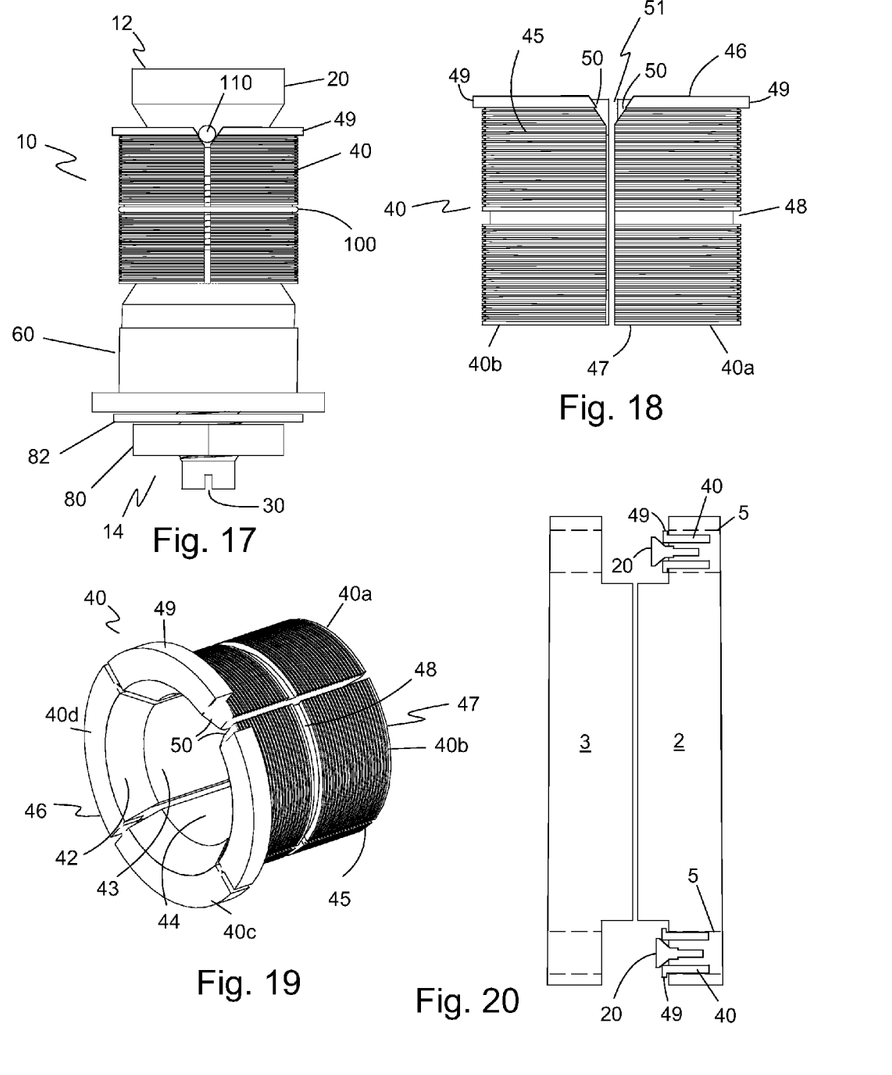
FIG. 17 is a side plan view of another embodiment of the present invention showing an expandable friction member with a flange.
FIG. 18 is an enlarged side plan view of the expandable friction member shown in FIG. 17.
FIG. 19 is an enlarged perspective view of the expandable friction member shown in FIG. 17.
FIG. 20 is a partial, cross-sectional view of the expandable friction member showing insertion into a bolt hole before expansion and after expansion.

Turning now to FIGS. 17 to 20, there is illustrated pull-up bolt assembly 10 showing another embodiment of expandable friction member 40. In this embodiment, expandable friction member 40 includes a friction member flange 49 that extends laterally from outside surface 45 at friction member end 46. This embodiment may be used with manway covers that incorporate a gasket between the cover and the mating flange. The gasket is not always a full-faced gasket covering the entire opposing surfaces of the cover 2 and mating flange 3. There is typically a gap between the mating flange 3 and the cover 2 where the gasket is located. This is more clearly shown in FIG. 20. FIG. 20 is a partial illustration of the flange 49 and pull-up bolt member 20. The spacing between cover 2 and flange 3 is exaggerated in order to more clearly show the position of the gasket. At a top bolt opening 5, pull-up bolt assembly 10 is shown within bolt opening 5 in a non-expanded condition. In this configuration, friction member flange 49 can slide through bolt opening 5. At a bottom bolt opening 5, pull-up bolt assembly 10 is shown within bolt opening 5 in an expanded condition. As can be seen, friction member flange 49 is positioned beyond the inside edge of bolt opening 5 and forced into the gap causing friction member flange 49 to expand to a diameter larger than bolt opening 5. Friction member flange 49 further prevents pull-up bolt assembly 10 from being pulled out of bolt opening 5, providing greater resistance to the pull-out forces imposed by cover 2.

Figure 21:
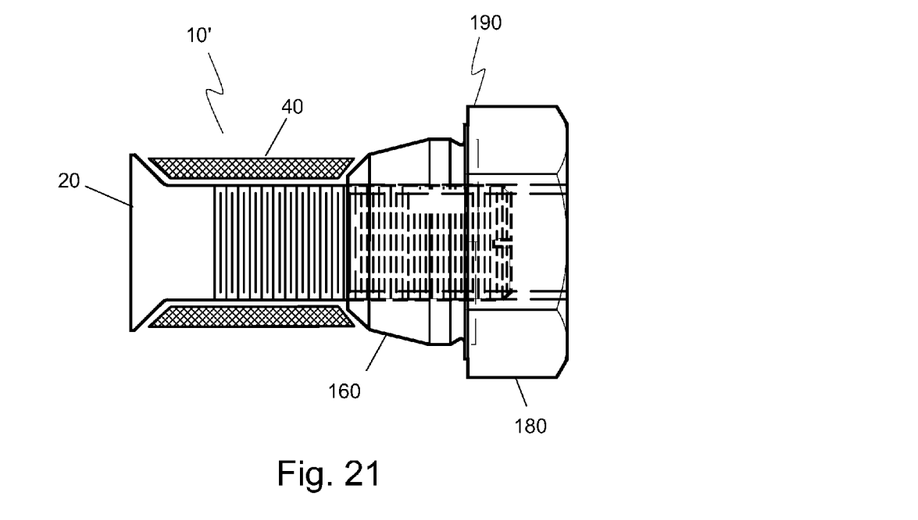
FIG. 21 is a side, partial cross-sectional view of a pull-up bolt assembly using the embodiment of the integral tapered member and pull-up bolt nut shown in FIG. 12.

FIG. 21 is a cross-sectional view of a pull-bolt assembly 10' of the present invention. In this embodiment, the bushing nut component 190 is threadably connected to threaded shaft 22 of pull-up bolt member 20.

The assembled expandable pull-up bolt assembly 10 is designed to create a friction fit between the expandable friction member 40 and the inside diameter of the bolt openings in the cover or flange of a manway opening. In the preferred embodiment, the inboard faces of abutting member 25 (i.e. tapered surface 26) and of tapered member 60 (i.e. tapered portion 62) are tapered or inclined, as are the outboard faces of friction member ends 46, 47 (i.e. inner surfaces 42). Acceptable tapers may be between zero (0) degrees and ninety (90) degrees with the optimal taper being thirty degrees.

In use, as the nut component 80 is tightened onto threaded shaft 22, the tapered member 60 moves toward the abutting member 25. The radially expandable friction member 40 rides up on the tapered faces of tapered surface 26 and tapered portion 62 forcing the expandable friction member 40 radially outward. The assembled expandable pull-up bolt assembly 10 is designed to create a friction fit between the expandable friction member 40 and the inside diameter of the bolt openings in the cover and/or flange.

Figure 22:
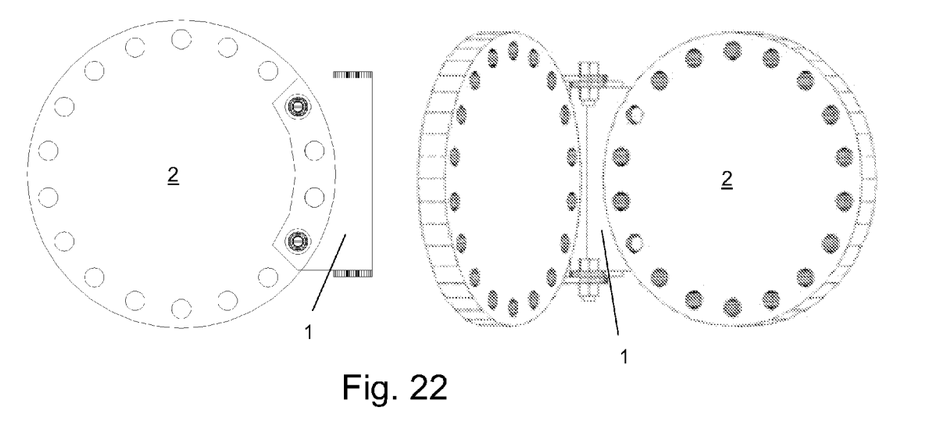
FIG. 22 is a perspective view of the present invention in use securing a hinge device to a manway cover.

The pull-up bolt assembly 10 is designed to resist shear and pullout forces when the cover of a manway opening is in the closed, open, and partially open positions. When the cover is closed, the plurality of fasteners (i.e. pull-up bolt assembly 10) on both the cover and flange sides are largely in shear. In this case, the applied load is equal to the weight of the cover acting through a moment arm approximately equal to half of the cover diameter. If the cover is domed, then there is small pullout force caused by the weight of the projection acting through a moment arm equal to the center of gravity of the projection. When the cover is open, the forces on the cover-side fasteners remain largely unchanged from the closed position. On the flange side, the forces are largely in line with the fasteners imposing a pullout force on the lower fastener equal to the weight of the cover acting through a moment arm approximately equal to half of the cover diameter. In partially open positions, the forces vary between the full open and full closed positions. FIG. 22 illustrates use of one embodiment of the pull-up bolt assembly 10 of the present invention connecting a manway hinge device 1 to a manway cover 2 and showing both the closed and open positions of the manway cover 2.

Figure 23:
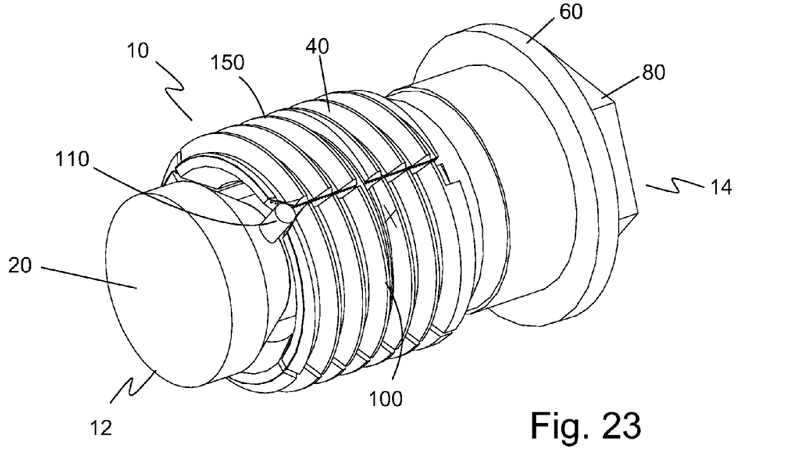
FIG. 23 is a perspective view of another embodiment of the present invention showing the pull-up bolt assembly with an expandable friction member having threads thereon.
Figure 24:
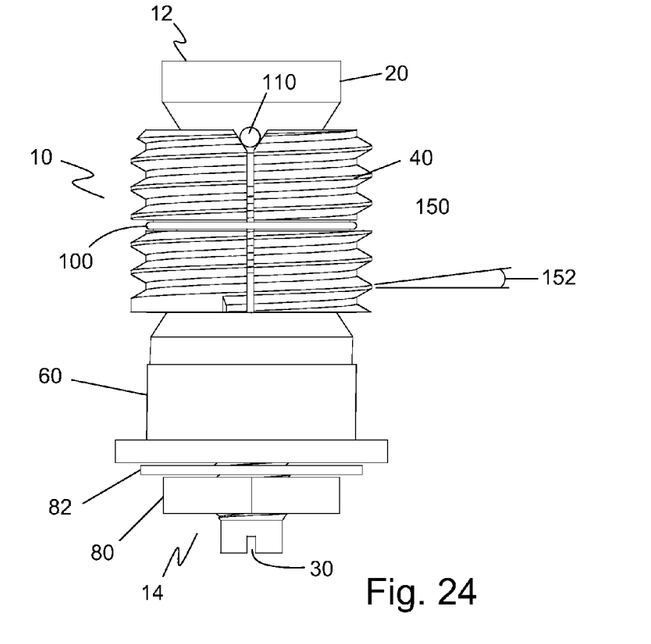
FIG. 24 is a side plan view of the embodiment shown in FIG. 23.
Figures 25, 26:
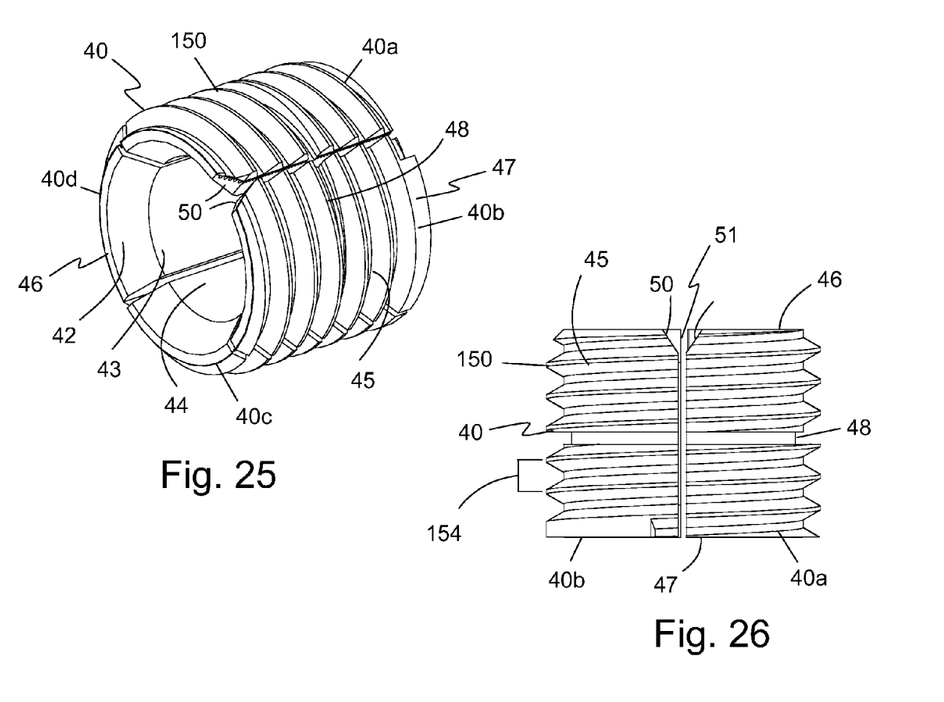
FIG. 25 is a perspective view of one embodiment of a radially expandable friction member shown in FIG. 23.
FIG. 26 is a side plan view of the expandable friction member shown in FIG. 25.

Turning now to FIG. 23, there is illustrated another embodiment of the present invention showing pull-up bolt assembly 10. Pull-up bolt assembly 10 includes a pull-up bolt member 20, a radially expandable friction member 40, a tapered member 60, and a nut component 80. Expandable friction member 40 may have one or more threads 150 about its outer circumference. Like the embodiment shown in FIG. 1, in this embodiment, a retaining ring 100 is disposed around the friction member 40 and an optional anti-rotation member 110 laterally extends from pull-up bolt member 20 and cooperates with expandable friction member 40. Pull-up bolt assembly 10 has a blind end 12 and a torque-applying end 14. Threads 150 serve to provide to expandable friction member 40 additional gripping and/or retention functionality when in the structure to which it is installed. It is contemplated that threads 150 are structured to match and mate with threads disposed in the manway cover bolt openings or the manway flange bolt openings or a threaded opening added to either or both of the manway cover and manway flange for securing the hinge device 1. Threads 150 may be flat, or have sharp or rounded edges. The profile of the threads may resemble a sawtooth wave, slanting away from angled surface 50. Other thread arrangements are also contemplated.

Threads 150 may have a helical angle 152. Helical angle 152 is the angle θ between a tangent line to the thread and a line perpendicular to the helical axis. Helical angle 152 can range between 0° and 90°. Preferably, helical angle 152 matches known and commonly used threads for the size and weight of manway covers. If helical angle 152 is large (i.e. the thread pitch is relatively larger than standard threads for bolts of similar size, there may be a reduced number of thread revolutions. Too little thread revolutions may cause the one or more threads to have a reduced gripping and/or retention effect. A very small helical angle or pitch may result in thread revolutions being too tightly spaced together. Too many tightly spaced threads may cause undue deformation or erosion of the structure to which the pull-up bolt is applied or to the pull-up bolt, also resulting in a reduced gripping and/or retention effect.

In other embodiments, helical angle 152 may vary over the length of expandable friction member 40. Utilizing a helical thread or series of helical threads with a helical angle that varies over the length of expandable friction member 40 may prevent rotation.

Figure 27:
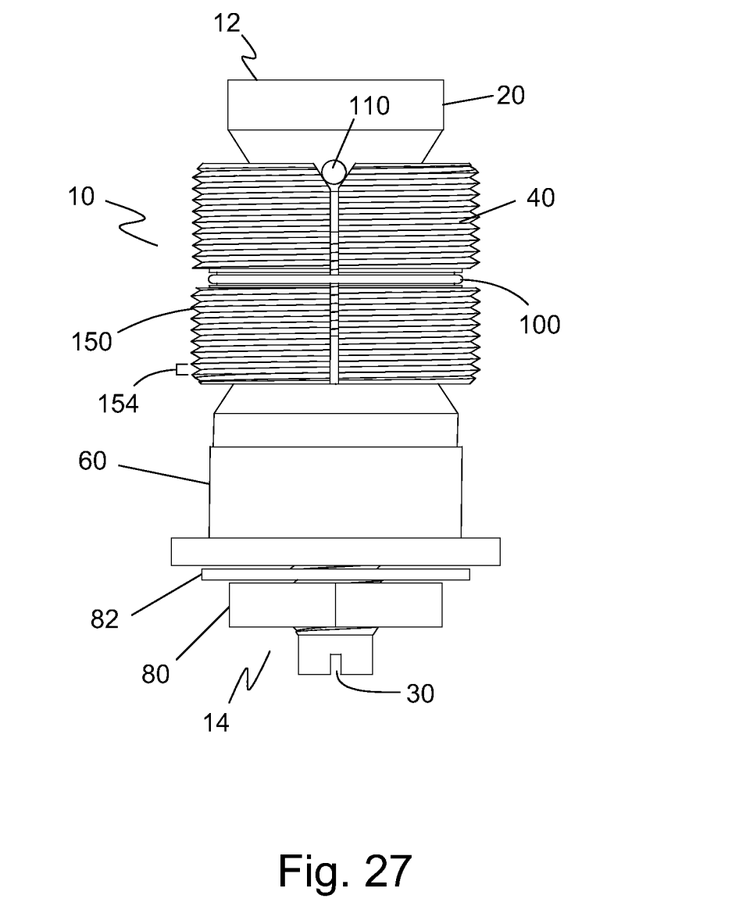
FIG. 27 is a side plan view of an embodiment of the expandable friction member having a helically disposed thread with small thread pitch.

Each thread 150 may have a thread pitch 154. As is known in the art, thread pitch 154 is the distance over which a portion of the thread covers the expandable friction member. As seen in FIG. 27 compared to FIG. 24, thread 150 may have relatively small thread pitch. Thread width can have any length no more than substantially the length expandable friction member 40. If thread pitch 154 is too large, there may result in a reduced number of thread revolutions.

Threads 150 may also have a non-standard thread height. Thread height or depth is the distance the thread extends away from the expandable friction member. Thread height or depth may have any practical length.

In embodiments with more than one consecutive thread helically disposed about expandable friction member 40, each thread 150 may have a different height and width. Of course, it is understood that in such an embodiment the threaded receiving opening would either need to match the predefined thread height and width or it would need to be a multiple of an existing thread so that the threads on the friction member would align with the threads in the threaded receiving opening of the manway cover and/or manway flange.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A method of using an improved pull-up bolt assembly for connecting a hinge device to a manway cover which includes removing a securing bolt from a manway cover and exposing a bolt opening in the manway cover, aligning an opening in a hinge plate of a hinge device with the bolt opening in the manway cover, the bolt assembly having a pull-up bolt member, a nut component, a tapered member, and an expandable friction member, the improved method comprising:

inserting a pull-up bolt assembly having one or more threads helically disposed on an outside surface of the expandable friction member where the one or more threads has a predefined height, a predefined width, and a predefined pitch whereby the expansion friction member is positioned within the bolt opening in the manway cover and the one or more threads of the expandable friction member aligns with internal threads of the bolt opening; and engaging the pull-up bolt causing the expansion friction member with the one or more threads to expand and securely fix the one or more threads of the pull-up bolt within the internal threads of the bolt opening of the manway cover and the hinge plate to the manway cover.

* * * * *